United States Patent Office 2,704,232
Patented Mar. 15, 1955

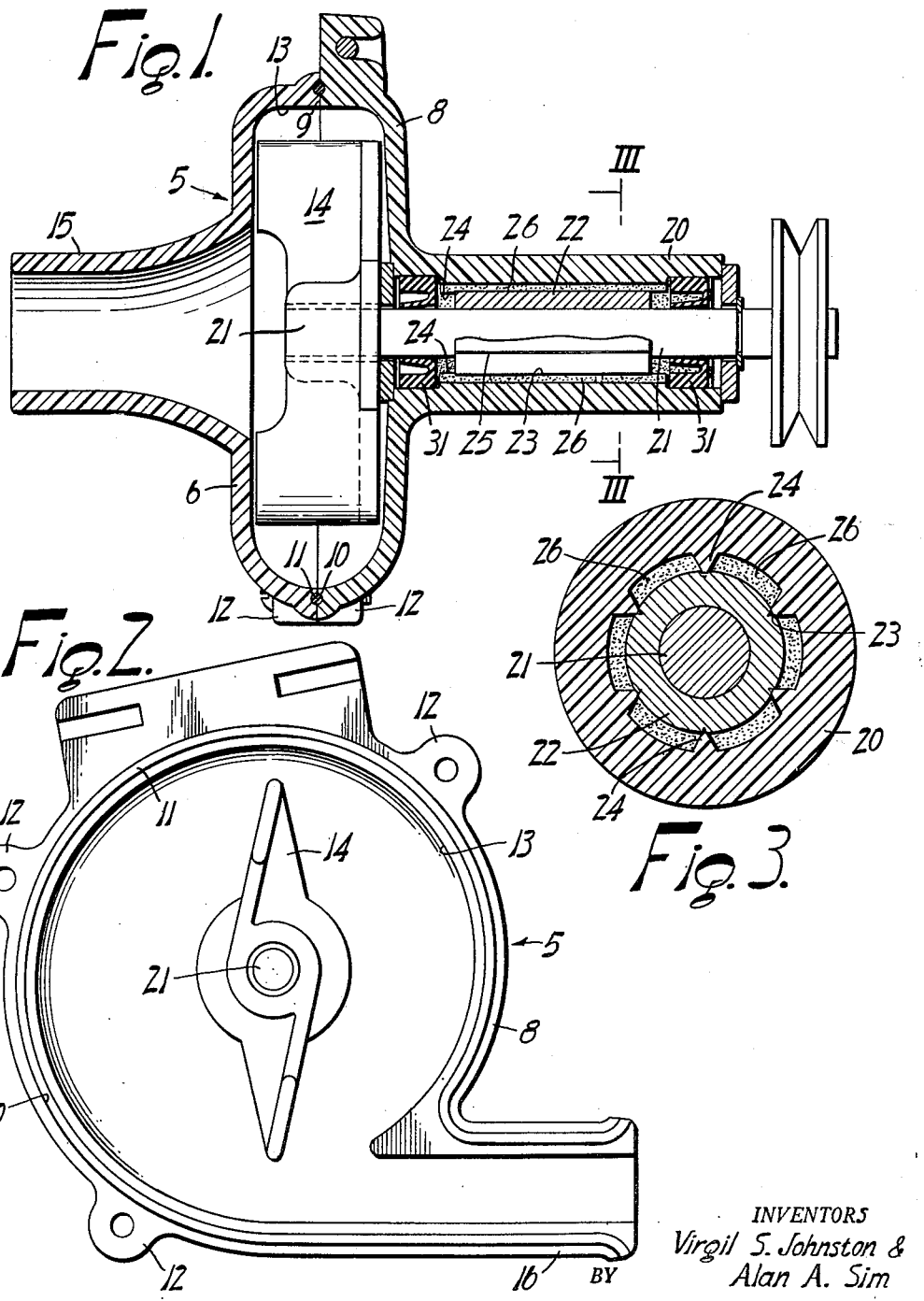

2,704,232

MACHINE FRAME CONNECTED BEARING

Virgil S. Johnston, Van Buren, Ark., and Alan A. Sim, Meadville, Pa., assignors to Johnston Plastic Pump Corporation, Buffalo, N. Y.

Application August 2, 1951, Serial No. 239,946

4 Claims. (Cl. 308—22)

Our invention relates in general to rotary water pumps of the type used in domestic washing machines and the like, and particularly to the impeller shaft bearing of such pumps and a method of making the same.

It is well known to those skilled in the art that in washing machines and other domestic machines little or no attention is paid to lubrication and it is, therefore, most desirable that bearings be used which provide permanent lubrication. Such bearings are usually made of suitable porous material impregnated with a lubricating medium, such as oil or light grease. It is obvious that the bearings must be held against rotation in the housing part supporting the same, and this is usually accomplished by making what is known as a press-fit, which, as is well known, implies that the bearing sleeve is made slightly larger than the round hole of the housing into which it is forced. Another method of securing the bearing against rotation is by molding the same within the housing of the pump. However, when the housing parts are made of molded plastic, such as the thermo-setting kind, certain problems arise which make both of these methods unsuitable. In the first instance, the plastic material of the housing is so brittle that it cracks when the bearing is forced into place owing to the expansion of the material. In the second method, the molding temperature of the plastic material causes the lubricating medium to be exuded from the pores of the bearing, thus impairing the bearing and making the same substantially useless as a permanent lubricating means.

The principal object of our invention is to provide a substantially lubricant impregnated bearing which may be held against rotation within the relatively fragile pump housing after the housing is molded and without the danger of producing cracks therein.

Another object is to provide a method of assembling the bearing sleeve within the housing, whereby it will be maintained in non-rotative manner.

Another object is to provide a series of ridges within the bearing-receiving member of the housing which support the bearing sleeve.

Furthermore, the ridges are so proportioned that the peaks thereof are slightly sheared off as the bearing is forced into the receiving member, and score marks are made in the periphery of the bearing sleeve, whereby the sleeve is locked in place against relative rotation with the housing.

Moreover, our invention provides a plurality of longitudinal spaces or channels for the reception of additional lubricating medium, which serves to provide necessary lubrication to the bearing when and if needed and which also prevents the initial oil of the bearing from drying out through constant and prolonged use thereof.

The above objects and advantages have been accomplished by the device shown in the accompanying drawings, of which:

Fig. 1 is a sectional elevation of our pump taken on the longitudinal centerline of the impeller shaft;

Fig. 2 is a face view of the bearing housing with a portion thereof removed; and, Fig. 3 is an enlarged sectional view taken on line III—III of Fig. 1.

The pump shown in the drawing is one especially adapted for use upon a household washing machine and is preferably made from synthetic plastic molded in final shape. The housing 5 comprises an inlet portion 6 and a bearing portion 8 united at the joint 9. The adjoining face of each housing part is formed with a groove 10 for the reception of a resilient gasket 11 to effect a seal between the housing parts. The parts are each provided with registering ears 12 for the reception of suitable fastening means.

The portions 6 and 8 of the housing are so formed as to provide a volute or scrowl-shaped chamber 13 in which is mounted the impeller 14 of the device. The inlet part of the housing is formed with an inlet sleeve 15, and both portions are formed with one-half of the outlet sleeve 16.

The bearing portion 8 of the housing is provided with a bearing hub 20 which is substantially coaxial with the inlet sleeve 15 of the housing. The impeller shaft 21 is extended through the bearing hub and is rotatably mounted within the bearing sleeve 22.

The bearing hub 20 is formed with a bore 23 having a plurality of inwardly extending spaced V-shaped ridges 24 so proportional as to have their upper edges or peaks coincident with a circle slightly smaller than the diameter of the bearing sleeve so that when the bearing sleeve is being assembled and is moved axially into the bearing hub, the peaks of the ridges will be slightly sheared off by contact with the forward edge of the sleeve. The material of the bearing sleeve is of such nature that shallow score marks 25 are simultaneously formed in the periphery thereof, which together with the frictional contact of the registering ridges will cause the sleeve to be firmly held within the hub against relative rotation therewith but without causing undesirable expansive strain upon the plastic material of the housing. In order to guide the bearing sleeve and to centralize it as it is being assembled, the V-shaped ridges are tapered somewhat at their outer ends.

When assembling our bearing the bearing sleeve is placed into the outer end of the bearing hub, the slight taper in the V-shaped ridges serving to initially centralize the sleeve. After the sleeve is thus positioned, it is pushed axially into the hub by any suitable means. As the two parts are thus assembled, the score marks in the sleeve, hereinbefore referred to, are formed as the peaks of the ridges are being sheared off. By this method of assembling, therefore, the bearing sleeve and supporting surfaces, formed by the ridges, are sized and fitted to each other without the usual expansive force and strain of a press fit. The longitudinal spaces 26 are then filled with a suitable lubricant, such as grease of proper viscosity and gaskets 31 are employed to seal the spaces and retain the grease, the bearing sleeve being of substantially less extent than the hub of the casing, to provide spaces for the gaskets 31.

While we have shown our invention as being applied to a bearing sleeve of porous lubricant-impregnated material, it is obvious that it is applicable to bearings which are not porous, but which are preferably of such nature that the plastic ridges will cause score marks to be formed as the peaks thereof are being sheared off. Furthermore, instead of shearing off the peaks of the ridges and forming registering score marks in the bearing sleeve as the parts are assembled, it is obvious that the score marks may be initially formed in the sleeve by any suitable means and the ridges sized in the molding process or subsequently by other means to snugly fit the score marks, the parts being so proportioned that there will be sufficient frictional contact to hold the parts in non-rotative manner without placing any undesirable expansive strain upon the housing hub. Moreover, in some cases, it may be desirable to hold the bearing sleeve in spaced relation with the bore of the housing hub by frictional contact with truncated cone-shaped ridges without the provision of registering score marks in the sleeve. These, and other modifications of the details herein shown and described without departing from the spirit of our invention or the scope of the appended claims.

What we claim is:

1. A centrifugal pump having a housing made of synthetic plastic and formed with a bearing hub, a bearing sleeve of scoreable material carried by said hub, an impeller shaft rotatably mounted within said sleeve, the bearing hub being formed with a bore having a plurality of inwardly extending longitudinally disposed relatively sharp V-shaped ridges for frictional bearing contact with the outer surface of the sleeve, the sleeve being made of material which will be scored by the relative axial movement of the V-shaped ridges thereover, whereby the bearing is held in non-rotative manner within the hub and spaces are provided for receiving and holding a suitable lubricant.

2. A centrifugal pump having a housing made of synthetic plastic and formed with a bearing hub, a self-lubricating bearing sleeve carried by the hub, an impeller shaft rotatably mounted within said sleeve, the sleeve having a plurality of shallow longitudinally arranged score marks, and the hub having a plurality of inwardly extending and longitudinally disposed V-shaped ridges in registrational frictional contact with the score marks of the sleeve.

3. In a centrifugal pump, the combination with the housing and the impeller shaft thereof, of a bearing assembly, comprising a cylindrical self-lubricating bearing sleeve for rotatably mounting the shaft, and a bearing hub of synthetic plastic material carried by the housing and formed with a longitudinal bore having a plurality of relatively sharp longitudinally disposed V-shaped ridges formed on its inner surface and in centralizing contact with the sleeve throughout the length thereof.

4. In a centrifugal pump, the combination with the housing and the impeller shaft thereof, of a bearing assembly, comprising a cylindrical self-lubricating bearing sleeve formed with a plurality of shallow score marks for rotatably supporting the shaft, and a bearing hub of synthetic plastic material carried by the housing and having a length substantially greater than the length of the sleeve, the hub being formed with a coaxial bore having a plurality of longitudinally disposed V-shaped ridges radially arranged and extending inwardly toward the axis of the bore, the ridges being in centralizing contact with the score marks of the sleeve throughout the length thereof.

References Cited in the file of this patent

UNITED STATES PATENTS

| | | |
|---|---|---|
| 1,946,063 | Dodge | Feb. 6, 1934 |
| 2,119,334 | Leffler | May 31, 1938 |
| 2,179,856 | Leighton | Nov. 14, 1939 |
| 2,180,282 | Leighton | Nov. 14, 1939 |
| 2,180,283 | Leighton | Nov. 14, 1939 |
| 2,358,499 | Fieldler | Sept. 19, 1944 |
| 2,438,867 | Rockwell | Mar. 30, 1948 |
| 2,446,515 | Weingart | Aug. 3, 1948 |
| 2,477,043 | Carlson | July 26, 1949 |
| 2,573,597 | Paden | Oct. 30, 1951 |
| 2,622,949 | Cotchett | Dec. 23, 1952 |

OTHER REFERENCES

Ser. No. 320,217, Schmidt (A. P. C.), published May 25, 1943 (abandoned).